(12) United States Patent
Zhang et al.

(10) Patent No.: US 12,475,078 B2
(45) Date of Patent: Nov. 18, 2025

(54) POST-EXASCALE GRAPH COMPUTING METHOD, SYSTEM, STORAGE MEDIUM AND ELECTRONIC DEVICE THEREOF

(71) Applicant: Huazhong University of Science and Technology, Wuhan (CN)

(72) Inventors: Yu Zhang, Wuhan (CN); Jin Zhao, Wuhan (CN); Hui Yu, Wuhan (CN); Yun Yang, Wuhan (CN); Xinyu Jiang, Wuhan (CN); Shijun Li, Wuhan (CN); Xiaofei Liao, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 721 days.

(21) Appl. No.: 17/815,436

(22) Filed: Jul. 27, 2022

(65) Prior Publication Data

US 2023/0281157 A1    Sep. 7, 2023

(30) Foreign Application Priority Data

Mar. 7, 2022 (CN) .......................... 202210234737.4

(51) Int. Cl.
*G06F 15/80* (2006.01)
*G06F 9/50* (2006.01)
*H04L 67/10* (2022.01)

(52) U.S. Cl.
CPC ............ *G06F 15/80* (2013.01); *G06F 9/5066* (2013.01); *H04L 67/10* (2013.01)

(58) Field of Classification Search
CPC ..................................................... G06F 9/5066
See application file for complete search history.

(56) References Cited

U.S. PATENT DOCUMENTS

| 7,844,959 | B2* | 11/2010 | Isard | ...................... | G06F 9/5066 |
| | | | | | 712/7 |
| 10,089,761 | B2* | 10/2018 | Viswanathan | ............ | G06T 1/60 |
| 2015/0350324 | A1* | 12/2015 | Hu | ...................... | H04L 67/1097 |
| | | | | | 709/219 |

(Continued)

FOREIGN PATENT DOCUMENTS

| CN | 109918199 A | 6/2019 |
| CN | 110704693 | 1/2020 |

(Continued)

OTHER PUBLICATIONS

Roy et al., "Chaos: Scale-out Graph Processing from Secondary Storage", 2015, ACM, pp. 1-14 (Year: 2015).*

(Continued)

*Primary Examiner* — Lewis A Bullock, Jr.
*Assistant Examiner* — John Robert Dakita Ewald
(74) *Attorney, Agent, or Firm* — Michael Ye; Kalos Athena Wang PLLC

(57) ABSTRACT

The present invention relates to a post-exascale graph computing method, and corresponding system, storage medium and electronic device. The invention solves the problems of low computing performance, poor scalability and high communication overhead in the large-scale distributed environment, and improves the performance of the supercomputer when supporting large-scale graph computing.

4 Claims, 6 Drawing Sheets

(56) References Cited

U.S. PATENT DOCUMENTS

| | | | |
|---|---|---|---|
| 2016/0342445 A1* | 11/2016 | van der Lugt | H04L 67/10 |
| 2017/0068606 A1 | 3/2017 | Vora et al. | |
| 2020/0342297 A1* | 10/2020 | Dai | H04L 41/0893 |
| 2020/0364084 A1 | 11/2020 | Zheng et al. | |
| 2021/0081347 A1 | 3/2021 | Liao et al. | |

FOREIGN PATENT DOCUMENTS

| | | | | |
|---|---|---|---|---|
| CN | 110769050 A | | 2/2020 | |
| CN | 111737540 A | * | 10/2020 | ......... G06F 16/9024 |
| CN | 113392280 A | | 9/2021 | |

OTHER PUBLICATIONS

Shu et al; EnsembleGraph: Interactive Visual Analysis of Spatiotemporal Behaviors in Ensemble Simulation Data.

Wang, et al; Survey on Technologies of Distributed Graph Processing Systems; Journal of Software, 2018, pp. 569-586, 29(3), China Academic Journal Electronic Publishing House.

Li, et al: Asynchronous Iterative Updates Method Based on Subgraph in Spark, Computer Engineering and Applications. 2020, pp. 67-73, 56(7), School of Computer Science, Hubei University of Technology, Wuhan China.

Zhao, X., Approaches for Efficient Concurrent Graph Processing on Heterogeneous Environment, May 29, 2019, Huazhong University of Science and Technology, Wuhan, China.

* cited by examiner

POST-EXASCALE GRAPH COMPUTING METHOD, SYSTEM, STORAGE MEDIUM AND ELECTRONIC DEVICE THEREOF

This application claims the benefits of Chinese Patent Application No. CN202210234737.4 filed Mar. 7, 2022, which is hereby incorporated by reference as if fully set forth herein.

BACKGROUND OF THE INVENTION

1. Technical Field

The present invention relates to the technical field of graph computing, and more particularly to a post-exascale graph computing method, system, storage medium and electronic device thereof.

2. Description of Related Art

Graphs can well describe relationships among things in the era of big data, and feature excellent ability of expression in terms of structure and semantics. Therefore, numerous applications involving analytics of big data employ iterative graph processing to exploit data information they need. For example, the single-source shortest path algorithm can be used to identify the shortest path between things, and the connected-component algorithm is a useful tool to find community relations in data. Meanwhile, with the explosive growth of data volume, graph data are increasing in scale, and demands even higher computing capacity. For example, in a circuit graph of an AI chip, the number of graph vertices can reach the tera scale. In scientific computing for large-scale graph data, supercomputers are frequently employed to acquire analytic results in a fast and efficient manner.

However, graph computing is very different from the traditional scientific computing in that it can manifest problems like complex data dependency, unbalanced loads, poor data locality, irregular data accesses and more. This makes the big data processing system in the traditional supercomputers awkward with large-scale graph computing. In particular, existing graph computing systems designed for supercomputers are less aware of complex dependency among states of graph vertices during the execution. As its basic unit for parallel data processing is a graph vertex or an edge, it is difficult for a graph vertex to propagate its latest state to its neighbors fast and effectively, causing significant useless state updating of graph vertices, and low computing efficiency seriously (slow convergence and huge consumption of underlying hardware resources. For example, redundant loading of data leads to consumption of resources such as memory bandwidth). In this case, the finite hardware resources will form a performance bottleneck in large-scale graph computing, and eventually limit the overall performance of the system. Additionally, during graph computing, complex and irregular dependency among data can incur many irregular data accesses and very poor data locality. For example, a traditional CPU architecture accesses 64 bytes of data ever time, in which only 4 or 8 bytes of data are useful. It incurs under-utilization of both storage resources and memory bandwidth. Furthermore, according to the existing scheme, the states of all vertices in the graph are sequentially propagated along the dependency chains among these vertices during the execution. This makes the large amount of parallel computing resources on the underlying platform underutilized, and the graph computing jobs executed in the underlying platform take prolonged time to converge and require high data access overheads to repeatedly load graph data to process them. Moreover, complex dependency among graph data also results in the fact that frequent and irregular small-sized messages have to be communicated among computing nodes, which causes mass, redundant communication messages, such as packet heads and graph vertex ID information, and also causes significant network communication overheads. All these limit performance and scalability of supercomputers in large-scale graph computing.

China Patent Document No. CN110704693A discloses a distributed graph computing system and distributed graph computing method. The system comprises a plurality of computers and a database, wherein each computer is provided with one or more computing nodes. Initialization is firstly carried out, and each computing node reads a part of edges of the disjoint original graph from the database. The main body calculation process adopts an subgraph-centric iterative computing method, and simultaneously adopts a graph shrinking and repartitioning to accelerate convergence, wherein each iteration comprises the following steps: a repartitioning step, namely, at the beginning of each iteration, repartitioning the currently calculated graph; a local computing step; a shrinking step, after local computing of each node is completed, deleting the determined useless partial vertices/edges, and reconstructing the original graph; and judging whether all the remaining edges can be stored in a single computing node, if so, finishing the iteration, and otherwise, returning to the step of repartitioning. The graph computing method technology can effectively reduce the number of iteration rounds required by algorithm convergence and improve the calculation efficiency.

In addition, on one hand, due to the differences in the understanding of those skilled in the art; on the other hand, due to the fact that the applicant studied a large amount of literature and patents when putting the invention, but space limitations do not allow all the details and content are described in detail, however, this does not mean that the invention does not have these prior art features, on the contrary, the present invention already has all the features of the prior art, and the applicant reserves the right to add relevant prior art to the background technology.

SUMMARY OF THE INVENTION

According to the existing scheme, the state propagations of all vertices in the graph are sequentially performed along the dependency chains among these vertices during the execution. This makes massive parallel computing resources on the underlying platform underutilized, and the graph computing jobs executed in the underlying platform take prolonged time to converge and require high data access overheads to repeatedly load graph data to process them. Moreover, complex dependency among graph data also results in the fact that frequent and irregular small-sized messages have to be communicated among computing nodes, which causes mass, redundant communication messages, such as packet heads and graph vertex ID information, and also causes significant network communication overheads. All these are factors limiting performance and scalability of supercomputers in large-scale graph computing.

In response to the deficiencies of the prior solutions, the present invention provides a post-exascale graph computing method, at least comprising: performing distributed, asynchronous graph computing and establishing hierarchical, very-large-scale, distributed communication, wherein the step of performing distributed, asynchronous graph processing at least comprises: with a core subgraph constructed, having at least one computing node select graph blocks including active graph vertices in the core subgraph and perform asynchronous graph computing on the graph blocks based on a topology-aware graph processing mechanism.

In the asynchronous graph computing according to the present invention, the graph blocks which belong to the core subgraph and also contain active graph vertices are selected first for processing, so as to quickly propagate state information of important graph vertices and accelerate state convergence among these graph vertices, thereby preventing long-tail effects during graph computing. Besides, for processing each graph block, a topology-aware graph processing mechanism is employed to schedule the graph data in the graph blocks to each core according to the topological order of graph data for parallel processing, thereby effectively accelerating vertex state propagation, preventing useless graph vertex processing, and reducing overheads for data accessing.

The step of establishing hierarchical, very-large-scale, distributed communication at least comprises: arranging computing nodes into a tree-like structure, partitioning graph data in a community-structure-aware manner, and assigning them to each computing node; after the graph data of each computing node and of the lower layer computing nodes that are subordinate to it have converged, having the computing node communicate with a higher layer computing node that it is subordinate to and with the computing nodes that are of the same layer as it, so as to synchronize states of the graph vertices that are peers; and performing communication layer by layer until all graph vertices in a cluster have their states converged.

In the present invention, the graph data are partitioned in a community-structure-aware manner so that core subgraphs on which the graph vertices are tightly dependent are placed in the same group. This ensures that frequent communication in the core subgraphs only happens inside the same group, thereby reducing overheads for global communication.

Preferably, the method further comprises: before distributed, asynchronous graph processing is performed, having each computing node partition its local graph into fine-grained blocks, and differentiating high-degree blocks from low-degree blocks according to degrees of the graph vertices in the blocks, and selecting and using the high-degree blocks to construct core subgraphs, wherein during construction of the core subgraphs, identifying core graph vertices, and merging and storing data of states of the core graph vertices. In the present invention, coalescing of the state data can obtain better temporal/spatial locality of these data, thereby ensuring most state data of graph vertices loaded to the cache are useful, and in turn reducing data access overheads.

Preferably, the step of having at least one computing node select graph blocks including active graph vertices in the core subgraph and perform asynchronous graph computing on the graph blocks based on a topology-aware graph processing mechanism at least comprises: having the at least one computing node select the high-degree blocks including active graph vertices in the core subgraph, and based on the topology-aware graph processing mechanism, scheduling the graph data in the high-degree blocks to each core according to graph topological order for parallel processing, which can efficiently accelerates propagation of graph vertices state information, avoid useless graph vertices processing, and reduce data access overheads.

Preferably, the step of having at least one computing node select graph blocks including active graph vertices in the core subgraph and perform asynchronous graph computing on the graph blocks based on a topology-aware graph processing mechanism further comprises: during processing of the high-degree blocks, sorting updated data of the states of the graph vertices according to the order of graph vertex IDs, and applying the sorted updated data of the states of the graph vertices to the corresponding graph vertices according to the sorted order to update their state values, so as to convert random accesses of the updated data of the states of the graph vertices into regular, ordered accesses, thereby reducing ineffective data accesses.

Preferably, the step of having at least one computing node select graph blocks including active graph vertices in the core subgraph and perform asynchronous graph computing on the graph blocks based on a topology-aware graph processing mechanism further comprises: after the graph data of the computing node reach local convergence through computing and requirements for communication to be performed are not fully satisfied, having the computing node generate state value dependency between the graph vertices having to communicate its state value and at least one graph vertices that is not the direct neighbor to it, and having the computing node update the state value of the graph vertices after communication based on the state value dependency, so that update of the graph vertices can be quickly propagated. This allows the graph vertices state values updated through communication to be quickly propagated to more graph vertices, thereby accelerating communication about vertices states, and improving effective parallelism of computing resources.

Preferably, the step of arranging computing nodes into a tree-like structure, partitioning graph data in a community-structure-aware manner, and assigning them to each computing node at least comprises: arranging a plurality of computing nodes into the tree-like structure; partitioning the graph data in a community-structure-aware manner to form graph partitions, and grouping the core subgraphs having their graph vertices highly dependent on each other into the same group of computing nodes according to the dependency of the state values, so that frequent communication among the core subgraphs happen inside the same group of the computing nodes, so as to reduce overheads for global communication.

Preferably, the step of arranging computing nodes into a tree-like structure, partitioning graph data in a community-structure-aware manner, and assigning them to each computing node further comprises: when some computing nodes communicate, merging communication information sent to the same graph vertices based on reduction so as to decrease communication traffic; and/or sending the communication information to be sent to the same computing node in a merged and unified form, so as to make full use of network bandwidth and reduce the overheads of frequent small message communication. In addition, through compression of messages and removal of unnecessary information such as vertex IDs from messages, communication traffic can be further lowered.

The present invention further provides a post-exascale graph computing system, comprising at least a processor, comprising at least: a first module for performing distributed, asynchronous graph processing; a second module for establishing hierarchical, very-large-scale, distributed communication:

wherein the first module being configured to: with a core subgraph constructed, have at least one computing node select graph blocks including active graph vertices in the core subgraph and perform asynchronous graph computing on the graph blocks based on a topology-aware graph processing mechanism, and the second module is configured to: arrange computing nodes into a tree-like structure, partition graph data in a community-structure-aware manner, and assign them to each computing node; after the graph data of each computing node and of the lower layer computing nodes that are subordinate to it have converged, have the computing node communicate with a higher layer computing node that it is subordinate to and with the computing nodes that are of the same layer as it, so as to synchronize states of the graph vertices that are peers; and perform communication layer by layer until all said graph vertices in a cluster have their states converged.

The present invention further provides a storage device having a computer program stored thereon, and the program, when executed by a processor, implements the steps of the post-exascale graph computing method of the present application.

The present invention further provides an electronic device, and it comprises: a memory having a computer program stored thereon; a processor for executing the computer program in the memory to implement the steps of the post-exascale graph computing method of the present application.

The advantages of the system, storage device, and electronic device for post-exascale graph computing of the present invention are the same as those of the post-exascale graph computing method of the present invention and will not be repeated.

DETAILED DESCRIPTION OF THE INVENTION

Figure 1:
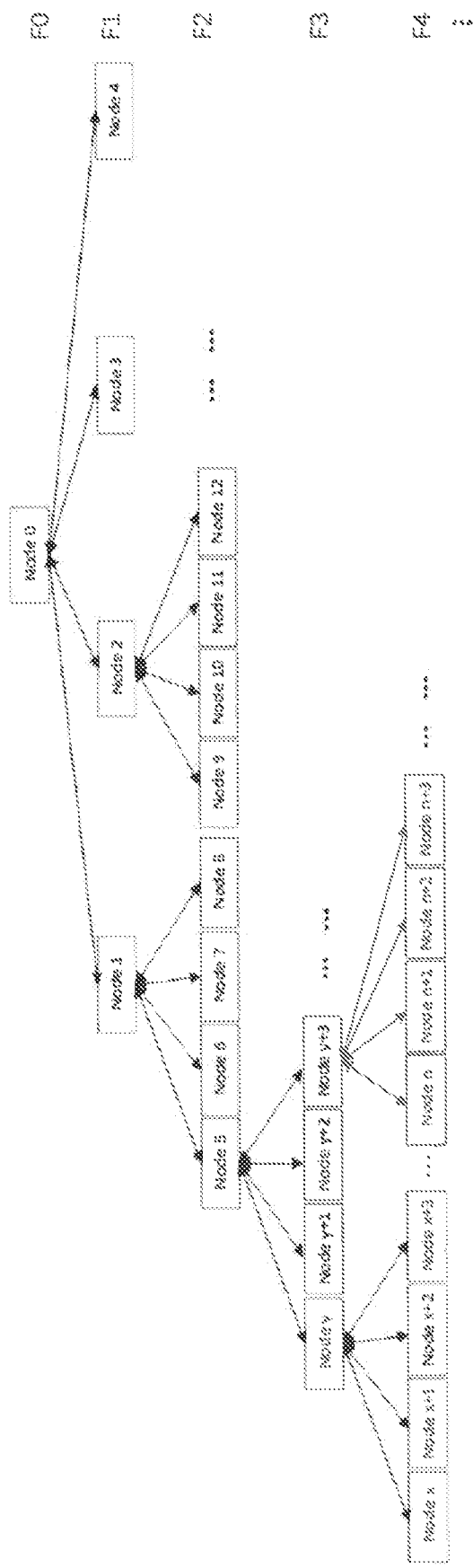
FIG. 1 is a logic structural diagram illustrating grouping-based hierarchical tree-like communication according to the present invention.

The present invention will be further detailed below with reference to accompanying drawings.

The present invention provides a post-exascale graph computing method and its system, its storage medium, as well as its electronic device.

The central concept of the present invention is herein described. First, computing nodes use fine-grained blocks to realize asynchronous graph processing, so that every block loaded to the cache will be processed to the extent that local convergence is reached and then the block is swapped out, so as to obtain better data access locality and prevent repeated redundant data loading. In addition, important graph blocks are selected and processed preferentially to accelerate state propagation of important graph vertices. Moreover, for processing each block, a topology-aware asynchronous graph processing mechanism is employed to quickly propagate the latest state information of active graph vertices along the graph topology for faster state propagations. State updating for graph vertices during graph computing is regularized to minimize random accesses and also improve utilization of the cache and the memory bandwidth, and to lower the overheads for vertex state updating. Furthermore, the storage and access of the state data of core graph vertices are coalesced, with the attempt to obtain better temporal/spatial locality of these data, thereby ensuring most state data of graph vertices loaded to the cache are useful. Dependency of the state values between the graph vertices whose state values need to be communicated and another not-directly-adjacent graph vertex is generated to further accelerate propagation of the vertex states, thereby enhancing effective parallelism of computing resources. In every round of graph computing for every computing node, communication only happens when local convergence of graph blocks of the computing node is reached. This helps accelerate the propagation of vertex states and make full use of computing capacity of each computing node, while reducing communication frequencies and data volume. After each round of graph computing for each computing node, a grouping-based, hierarchical, tree-like communication mode regularizes numerous, irregular, global communication of small-sized messages by converting most irregular, global communication of small-sized messages into local communication, thereby effectively limiting negative effects of communication of small-sized messages on the entire network and the entire cluster. Additionally, hierarchical communication of messages is employed to effectively merge small-sized messages, thereby making full use of the network bandwidth. Before communication, messages to be sent to the same computing node are merged and compressed, communication for irregular small-sized messages can be converted into ordered, regular communication and unnecessary information such as graph vertex IDs is removed from messages to be communicated, thereby reducing overheads for frequent communication of small-sized messages, lowering communication traffic, and improving bandwidth usage.

Embodiment 1

The present invention relates to a post-exascale graph computing method, at least comprising: performing distributed, asynchronous graph processing and establishing hierarchical, very-large-scale, distributed communication.

in which the step of performing distributed, asynchronous graph processing at least comprises:

with a core subgraph constructed, having at least one computing node select graph blocks including active graph vertices in the core subgraph and perform asynchronous graph computing on the graph blocks based on a topology-aware graph processing mechanism.

A core subgraph refers to a subgraph composed by high-degree graph blocks. Processing for the core subgraph dominates speed of convergence during graph computing.

An active graph refers to a graph data need to be processed in the current iteration of processing.

Specifically, before distributed, asynchronous graph processing is performed, the method further includes having each said computing node partition its local graph into fine-grained blocks, differentiate high-degree blocks from low-degree blocks according to degrees of the graph vertices in the blocks, and select the high-degree blocks to construct a core subgraph.

For example, each computing node has its local graph partition $G_i$ partitioned into fine-grained graph blocks P. The graph block may have a size $|P|$ determined by the formula:
$|P|+$ $$\frac{|P|}{|G|} * |V| * |U_v| + |R| \le |LLC|.$$

$|G|$ is the size of the graph data, $|V|$ is the number of the graph vertices, $|U_v|$ is the size of the state value of each vertex, $|LLC|$ is the size of the L3 cache, and $|R|$ denotes a reserved space. The value of $|P|$ is the maximum positive integer that satisfies the formula above.

The average degree $$ADeg_P = \frac{\sum_{v_i \in V_P} Deg(v_i)}{|V_P|}$$

of graph vertices in each graph block is then calculated, wherein $V_P$ is the set of the graph vertices of the graph block P, $|V_P|$ is the number of the graph vertices included in the graph block P, and $Deg(v_i)$ is the degree of the graph vertex $v_i$.

High-degree blocks and low-degree blocks are determined according to a threshold. The threshold is determined by the proportion of high-degree blocks defined by a user. For example, assuming that there are 100 graph blocks, and the user-defined proportion of high-degree blocks is 5%, after the graph blocks are descending-sorted according to $ADeg_P$, the threshold is $ADeg_{P_5}$ of the $5^{th}$ graph block $P_5$. A graph block having its ADeg greater than the threshold shall be identified as a high-degree block. The selected high-degree blocks are used to construct the core subgraph.

During construction of the core subgraphs, core graph vertices are identified, and state data of the core graph vertices are merged and stored. In the present invention, coalescing of the state data can obtain better temporal/spatial locality of these data, thereby ensuring most state data of graph vertices loaded to the cache are useful, and in turn reducing data access overheads.

A core graph refers to a subgraph composed by high-degree graph vertices and edges of these graph vertices.

A vertex refers to a component of a graph. A graph is composed by vertices and edges. A vertex in a graph represents a thing or an object, and an edge in a graph represents relations among things or objects.

Figure 2:
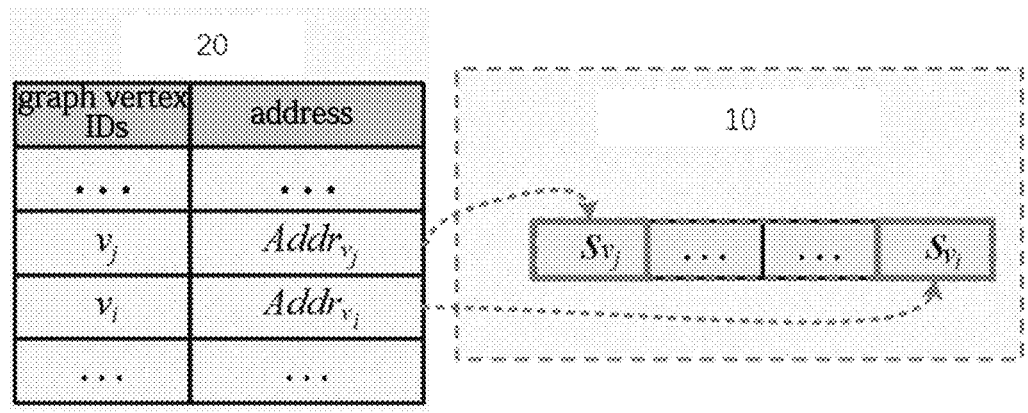
FIG. 2 is a schematic logic diagram illustrating merger of states of core graph vertices in a graph computing method according to the present invention.

First, core graph vertices are identified by the user-defined core vertex proportion. For example, if there are 10,000 vertices in the graph, and the user-defined proportion of core graph vertices is 0.5%, then the first 50 vertices after all the vertices are descending-sorted according to their degrees Deg(v) are core graph vertices. As shown in FIG. 2, every computing node has its local high-degree graph vertex states coalesced and stored in a local merged state table 10. In order to locally access the state values of the core graph vertices rapidly, a hash table 20 is built for each computing node, wherein, every key-value pair is written as $<v, Addr_{S_v}>$, where $Addr_{S_v}$ is the address of the state value $S_v$ of the graph vertex v in the merged state table 10.

In the asynchronous graph computing processing, graph blocks which belong to core subgraphs and contain active graph vertices are selected first for processing, so as to quickly propagate state information of important graph vertices and accelerate state convergence among these graph vertices, thereby preventing long-tail effects during graph computing.

To make selection, the graph blocks in the core subgraph are selected preferentially to acquire the graph data. At least one computing node selects the graph blocks which belong to core subgraphs and contain active graph vertices.

If all graph blocks on the computing node have converged, which means that there are no active graph vertices in the graph partition of the computing node, this indicates that the current round of graph computing is finished. If communication requirements have been met at this time, or to say that graph data on the computing node and the graph data on the computing nodes subordinate to it have all converged, a distributed communication module is triggered to synchronize the graph vertex states on different computing nodes. On the other hand, if the communication requirements are not met now, the computing node generates dependency of the state values between the graph vertices whose state values have to be communicated and another not-directly-adjacent graph vertex.

The graph data are acquired through the following process. To process every selected graph block, every CPU core of the computing node selects an active graph vertex from the graph block and adds it to a private queue Q. Herein, adding refers to writing the selected active graph vertex into the first-in-first-out queue Q in order. Every CPU core corresponds to one queue Q, so as to acquire the graph data using the graph vertex as the source vertex and according to the graph topology.

Preferably, the graph data are acquired in a breadth-first order, and asynchronous graph computing is performed according to the graph topological order. If there are no more active graph vertices in the graph block, it indicates that the currently selected graph block has reached local convergence. Then it is determined whether the communication requirements are met, and the corresponding action is taken accordingly.

Breadth refers to accessing all un-accessed, adjacent graph vertices of the current graph vertices at one time and performing the same processing on each adjacent graph vertex successively.

According to the topology-aware graph processing mechanism, the graph data in the high-degree blocks is scheduled to each CPU core according to the graph topological order for parallel processing, thereby effectively accelerating the propagation of graph vertex states, preventing useless graph vertex processing, and reducing overheads for data accessing.

The topology-aware graph processing mechanism is about accessing the graph data by beginning from the active graph vertices of the high-degree blocks in the breadth-first order and processing the accessed graph data, so that the graph data are processed along the dependency order among them.

Only when a graph block is processed to reach local convergence, can its following block be processed, so that the graph data loaded to the cache are repeatedly processed until they converge and then they are swapped out from the cache. This helps enhance temporal locality of the data (meaning a higher data reuse rate of the loaded data), thereby preventing repeated loading of the data, reducing data volume accessed, and saving overheads global synchronization, leading to faster propagation of graph vertex states, more active graph vertices, higher data parallelism, and eventually better core usage.

Preferably, every CPU core of every computing node takes one graph vertex $v_i$ from its corresponding queue Q successively, and acquires the neighbor graph vertices of $v_i$ (that form edges with $v_i$) and the corresponding state values of its neighbor graph vertices.

The process of acquiring and processing graph data further comprises: sending the state value of the source vertex of every edge to the destination vertex of the edge to update the state value of the destination vertex. Meanwhile, the graph vertex state value dependency table is read, and the post-communication state value of the graph vertex is propagated to other graph vertices rapidly by using the generated dependency of state values of graph vertices. Every propagation of the graph vertex state leads to generation of a graph vertex state update, namely <destination graph vertex IDs, update state value>. In the queue Q, after the graph data related to all graph vertices are processed, the resulting graph vertex state update leads to generation of a graph vertex state update stream.

In the process of processing the graph blocks, the update data of the graph vertex states are sorted according to the order of the graph vertex IDs. Then the sorted graph vertex state update data are applied to the graph vertices according to the set order so as to update their state values and to convert random accesses of the state update data to regular, ordered accesses, thereby reducing ineffective data accesses.

Sorting is made to the graph vertex state update stream according to the destination graph vertex IDs, and the sorted graph vertex state is updated and then applied to the corresponding graph vertices successively. This is done by computing the updated state value and the current state value of the destination graph vertex, so as to obtain the latest state value of the destination graph vertex.

To update the states of the core graph vertices, their state values in the merged state table 10 need to be updated, thereby obtaining better temporal/spatial locality for accessing the core graph vertex states. If a graph vertex has its state value updated, the graph vertex is set as an active graph vertex, and is added into the queue Q.

Whether there is still any active graph vertex in the queue Q is now to be determined. If the answer is yes, a further attempt is made to acquire graph vertices and the state values of the corresponding graph vertices. Otherwise, the graph block is processed again.

After the graph data of the computing node reach local convergence through computing and the communication requirements are not met, the computing node generates state value dependency between the graph vertex needing to communicate its state value and at least one graph vertex not immediately adjacent to it, the computing node based on the state value dependency, updates the graph vertex state value after communication, so that the update of the graph vertex can be propagated. This allows the graph vertex state values updated through communication to be quickly propagated to more graph vertices, thereby accelerating propagation about graph vertex states, and improving effective parallelism of computing resources.

Specifically, state value dependency between a graph vertex needing to communicate its state values and another not-directly-adjacent graph vertex is generated.

Since dependency between vertex state values is usually a linear expression, two graph vertices not immediately adjacent to each other can have dependency of their state values represented by: $S_y=a*S_x+b$, where $v_x$ and $v_y$ are two graph vertices that are not immediately adjacent to each other, $S_x$ and $S_y$ are the state values of the graph vertices $v_x$ and $v_y$, and a and b are constants.

Figure 3:
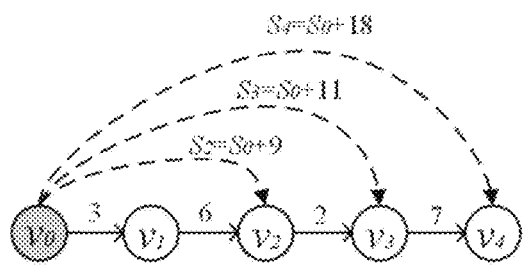
FIG. 3 is a schematic logic diagram showing dependency among state values of SSSP jobs in the graph computing method according to the present invention.

For example, in FIG. 3, the graph vertex needing to communicate its graph vertex state value is $v_0$. The SSSP algorithm is used to determine the state value dependency between $v_0$ and another not-directly-adjacent graph vertices (e.g., 12). As shown in FIG. 3, the constants a and b are 1 and 9, respectively. The dependency is found through: obtaining two sets of state values of the graph vertices $v_x$ and $v_y$, namely $<S_x, S_y>$ and $<S_y, S_y>$, after two times of iteration processing, and then obtaining the corresponding constants a and b by computing according to the two sets of state values.

The graph vertex state value dependency is stored.

When dependency between the state values of two graph vertex not immediately adjacent to each other are figured out, the corresponding parameters (i.e., $v_x$, $v_y$, a and b) are stored in vertex state value dependency table, like Table 1: Graph Vertex State Value Dependency Table.

TABLE 1

Graph Vertex State Value Dependency Table

| $v_x$ | $v_y$ | a | b |
|---|---|---|---|
| $v_0$ | $v_2$ | 1 | 9 |
| $v_0$ | $v_3$ | 1 | 11 |
| $v_0$ | $v_4$ | 1 | 18 |

After every time of communication, when the state values of the graph vertices needing to communicate their state values are updated, the updated graph vertex state values can be propagated to more graph vertices rapidly according to the generated dependency of the state values of the graph vertices, thereby accelerating and extending the propagations of the graph vertex states.

During generation of dependency of graph vertex state values, if the communication requirements are met at some moment, and the graph data on the current computing node and the graph data on its subordinate computing nodes all converge, another graph block having an active graph vertex is selected for processing.

After the foregoing distributed asynchronous graph processing, the hierarchical, very-large-scale distributed communication is established.

As shown in FIG. 1, computing nodes are arranged into a tree-like structure. Taking the computing nodes in FIG. 1 for example, there are 4 layers of computing nodes. The initial computing node at the $0^{th}$ floor F0 is Node 0. The computing nodes at the first floor F1 are Node 1 to Node 4. The computing nodes at the second floor F2 are Node 5 to Node 8, Node 9 to Node 12, . . . . The computing nodes at the third floor F3 are Node y to Node y+3, and the computing nodes at the fourth floor F4 are Node x to Node x+3, . . . , Node n to Node n+3, . . . .

Specifically, the computing nodes are grouped to form a hierarchical, tree-like communication architecture. In the example of FIG. 1, each group includes 4 computing nodes. These 4 computing nodes do not include the computing node corresponding to the root node of the tree-like structure. The groups jointly form a tree-like communication architecture as shown in FIG. 1.

During communication, each computing node only communicates with computing nodes subordinate to it, computing nodes it is subordinate to, and other nodes at the same floor and subordinate to the node to which it is subordinate.

The computing nodes subordinate to a computing node are child nodes forming a tree-like structure, as shown in FIG. 1. The computing nodes subordinate to the computing node Node y, or the child nodes in the tree-like structure, are Node x, Node x+1, Node x+2, and Node x+3. The computing node to which the computing node Node y is subordinate is the parent node in the tree-like structure, namely Node 5. The nodes at the same floor as the computing node Node y are the brother nodes in the tree-like structure, namely Node y+1, Node y+2, and Node y+3.

In a community-structure-aware partitioning manner, graph data are partitioned and assigned to each computing node.

In particular, a community is a subgraph on which graph vertices are tightly dependent.

Figure 4:
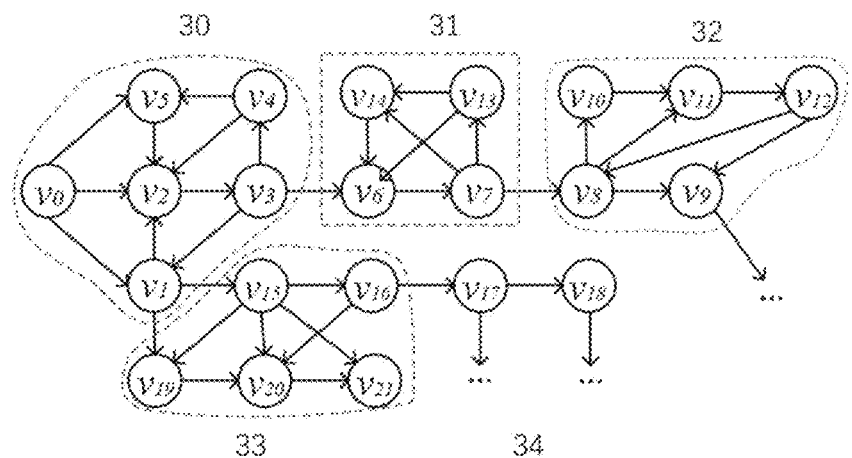
FIG. 4 is a schematic logic diagram illustrating a community detection algorithm in the graph computing method according to the present invention.

Communities will be assigned to the same group, or even the same computing node, so as to lower overheads for global communication. As shown in FIG. 4, a community detection algorithm (such as that based on label propagation) is used to detect community relationship in the graph structure. Then graph data that are community-associated with each other are assigned to the same group.

For example, in FIG. 4, graph vertices $v_0$ to $v_S$ belong to the initial community structure 30; graph vertices $v_6$, $v_7$, $v_{13}$ and $v_{14}$ belong to the first community structure 31; graph vertices $v_8$ to $v_{12}$ belong to the second community structure 32; graph vertices $v_{15}$, $v_{16}$, $v_{19}$, $v_{20}$, and $v_{21}$ belong to the third community structure 33. $v_{17}$ and $v_{18}$ belong to the $n^{th}$ community structure 34.

A mirror agent graph vertex refers to a copy of a graph vertex on another computing node.

Figure 5:
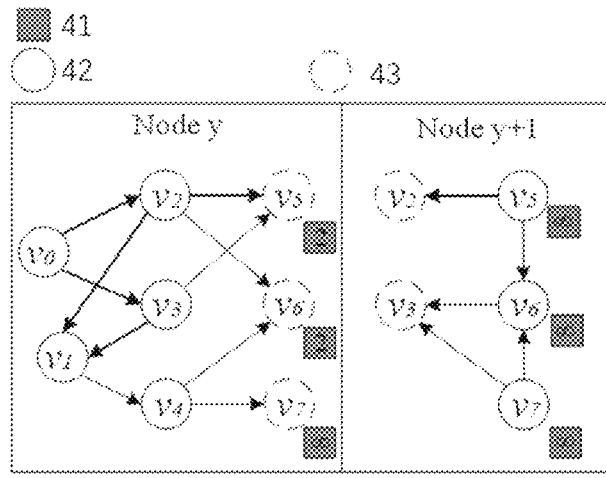
FIG. 5 is a schematic logic diagram illustrating multi-node communication in the graph computing method according to the present invention.

For example, an initial community structure 30 is assigned to computing nodes Node x, Node x+1, Node x+2, and Node x+3 in FIG. 1. Preferably, the Cartesian Vertex-Cut method is used for partitioning. In this method, only the master agent graph vertex has both the outgoing edge and incoming edge, while the agent graph vertex only has one of the outgoing edge and the incoming edge, as shown in FIG. 5. Through this way, the graph data will be partitioned into graph partitions. Then the graph partitions are assigned to computing nodes of a supercomputer.

After the graph data of each computing node and of the computing nodes that is subordinate to it and is at a lower floor have converged, having the computing node communicate with a computing node that is at a higher floor and it is subordinate to and with a computing node that is at its floor so as to synchronize states of the graph vertices that are peers; and performing communication floor by floor until all said graph vertices in a cluster have their states converged.

Specifically, every computing node, after its $T_j^{th}$ round graph computing, using the state value updates of the graph vertices whose state values have to be communicated to generate a message.

As shown in FIG. 5, after the graph partitions on a computing node converge, a communication message about the state values of its mirror agent graph vertices 43 is generated and sent to the corresponding master agent vertices on other computing nodes to synchronize the state values of corresponding vertices on different computing nodes. For example, after the graph partitions on the computing node Node y located in Floor 3 converge, a communication message reflecting the state values of its mirror agent graph vertices $v_5$, $v_6$ and $v_7$ is generated and sent to the graph vertices $v_5$, $v_6$ and $v_7$ on the Node y+1, so as to synchronize the state values of corresponding vertices on different computing nodes.

Therein, when the graph data are partitioning, graph vertices tightly dependent are placed in the same group in a community-structure-aware manner. This ensures that frequent communication in subgraphs only happens inside the same group, thereby reducing overheads for global communication.

Figure 7:
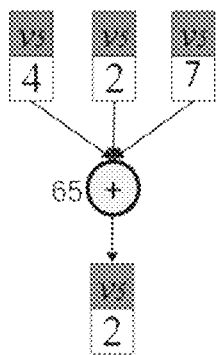
FIG. 7 is a schematic logic diagram illustrating a graph vertex state reduction algorithm in the graph computing method according to the present invention.

Specifically, after the communication messages are generated, as shown in FIG. 7, reduction is made on the communication messages related to the same graph vertices. In other words, plural communication messages related to the same graph vertex are merged into a communication message, thereby reducing communication traffic. Taking the SSSP algorithm for example, the state values in these communication messages are figured out to update the minimum.

Figure 8:
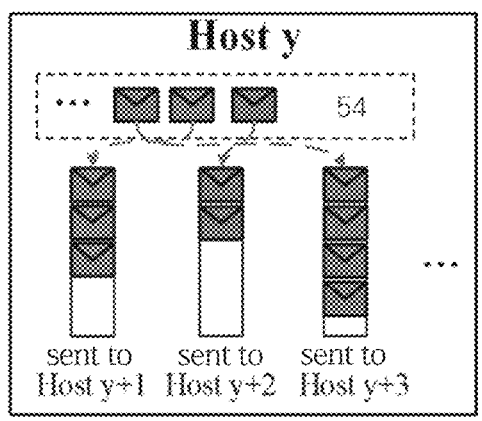
FIG. 8 is a schematic logic diagram illustrating message merger in the graph computing method according to the present invention.

As shown in FIG. 8, in the step 65 related to the reduction algorithm, information sent to the same computing node is merged to the same queue for communication at batch, thereby turning irregular, small-sized message communication into regular, large-sized message communication, i.e., the generated information 54, thereby enhancing usage of the network bandwidth.

A small-sized message refers to a communication message whose communication traffic is smaller than 2 KB.

A large-sized message refers to a communication message whose communication traffic is greater than or equal to 2 KB.

In the present invention, plural computing nodes are arranged into a tree-like structure, and the graph data are partitioned into graph partitions in a community-aware manner. According to dependency of the state values, core subgraphs on which the graph vertices tightly dependent are placed in the same group. This ensures that frequent communication in subgraphs only happens inside the same group, thereby reducing overheads for global communication.

When plural computing nodes make communication, the communication information to be sent to the same graph vertex is merged according to the reduction method, so as to reduce communication traffic. Additionally or alternatively, the communication messages to be sent to the same computing node are merged and issued together to the computing node, so as to make full use of the network bandwidth and reduce overheads for communication of frequent small-sized messages.

Preferably, in the present invention, through compression of messages and removal of unnecessary information such as vertex IDs from messages, communication traffic can be further lowered.

Figure 6:
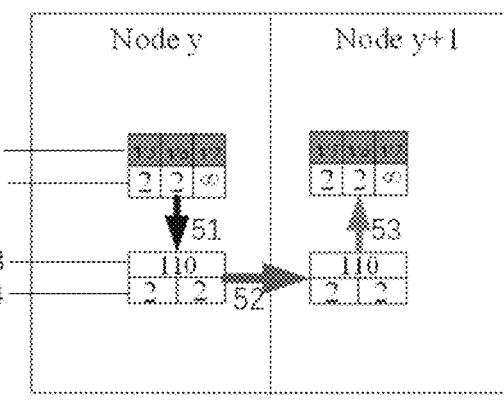
FIG. 6 is a structural diagram illustrating messages compression in the graph computing method according to the present invention.

As shown in FIG. 6, the communication messages in every queue are compressed. In particular, the communication messages are sorted according to the graph vertex IDs 61. Then a bitvector 63 is used to label the information of graph vertex IDs 61 corresponding to the second state value 64, and the information of the graph vertex IDs 61 is removed from the messages, thereby further reducing communication traffic. For example, the first state values 62 corresponding to the graph vertex IDs 61 form a bitvector 63 through the message compression step 51, wherein the bitvector 63 corresponds to the second state values 64. The bitvector 63 sends and receives through the message sending step 52. The receiving computing node performs the message decompression and reduction step 53 on the bitvector 63, so as to form the graph vertex state values again.

The computing nodes subordinate to the computing node Node y are nodes at the 4th floor, namely Node x, Node x+1, Node x+2, and Node x+3. After the graph data of the computing node Node y itself have all converged, the computing node Node y sends the graph vertex state data messages after reduction, merger, and compression to other computing nodes for communication. In particular, communication behaviours among multiple machines includes the following three types.

First, the computing node Node y and its subordinate computing nodes, namely Node x, Node x+1, Node x+2, and Node x+3 can communicate with each other. In particular, during communication, at first, the computing nodes subordinate to Node y send their communication messages to Node y. Node y then processes the communication messages with reduction, merger, compression, and then sends the regularized messages to the subordinate computing nodes, thereby preventing frequent communication for small-sized messages among the computing nodes.

Second, after communication as described in the first way, if the graph vertex state values of the corresponding computing nodes all remain unchanged, the computing node Node y uses the processed communication messages to communicate with the computing node it is subordinate to and the node at the same floor and belongs to the computing node it is subordinate, thereby synchronizing the graph vertex state values.

For example, after the graph data of the computing node Node y and of its subordinate computing nodes all reach local convergence, the computing node Node y uses the processed communication messages to communicate with Node 5 at the $2^{nd}$ floor where it belongs to and Node y+1, Node y+2, and Node y+3 node that are at the $3^{rd}$ floor as itself is and are subordinate to the same node as itself is, thereby synchronize graph vertex state value.

Third, if the computing node Node y and its subordinate computing nodes have to communicate with a computing node that is not directly subordinate to it and it is not directly subordinate to (such as Node n, Node n+1, Node n+2, or Node n+3 in FIG. 1), the communication messages are sent and transferred according to the tree-like communication structure, so as to prevent frequent, global communication of small-sized messages. As shown in FIG. 1, the related communication messages are first sent to Node y for collection. Then according to the tree-like hierarchical communication structure, the collected messages are sent to Node 5, and then to Node y+3. Node y+3 sends the related communication messages to the corresponding computing nodes (e.g., Node n, Node n+1, Node n+2, and Node n+3 in FIG. 1), respectively. As such, messages to be put into global communication can be sufficiently reduced, merged, and compressed, so that the network communication behaviours can become more regular.

After the graph data of all computing nodes have converged, or when each computing node has communicated with its subordinate computing nodes as well as the nodes at the same floor as it is and subordinate to the node it is subordinate to, if no graph vertex state values changes, the computing ends.

Embodiment 2

The present invention further provides a post-exascale graph computing system, comprising at least a processor, which comprises at least: a first module for performing distributed, asynchronous graph processing; a second module for establishing hierarchical, very-large-scale, distributed communication.

Both the first module and the second module can be one or more of processor, application specific integrated circuit, server and cloud server. The first module and the second module can also be integrated into a processor, application specific integrated circuit or server.

The first module being configured to: with a core subgraph constructed, have at least one computing node select graph blocks including active graph vertices in the core subgraph and perform asynchronous graph computing on the graph blocks based on a topology-aware graph processing mechanism, and the second module is configured to: arrange computing nodes into a tree-like structure, partition graph data in a community-structure-aware manner, and assign them to each said computing node; after the graph data of each said computing node and of a computing node that is subordinate to it and is at a lower floor have converged, have the computing node communicate with a computing node that is at a higher floor and it is subordinate to and with a computing node that is at its floor so as to synchronize states of the graph vertices that are peers; and perform communication floor by floor until all said graph vertices in a cluster have their states converged.

A chip or a processor loaded with the program for executing the disclosed method for post-exascale graph computing is generally installed on a computing equipment such as a server, a data center or a supercomputing platform. During actual application, the chip or processor loaded with the program for executing the disclosed method is used for analyzing data on the data center or the supercomputing platform. For example, it could be used to analyze social network graph data on a data center of an Internet company, to analyze e-commerce transaction graph data on the e-commerce platform, or used for anti-money laundering or anti-fraud analysis in financial field.

Preferably, the first module reads graph data that need to be processed from an internal storage (i.e., main memory) or a disk of a data center. After the first module completes processing the graph data, it sends the processed data to the second storage. After the second module completes processing the data, it writes the computing result back to the internal storage or the disk.

Figure 9:
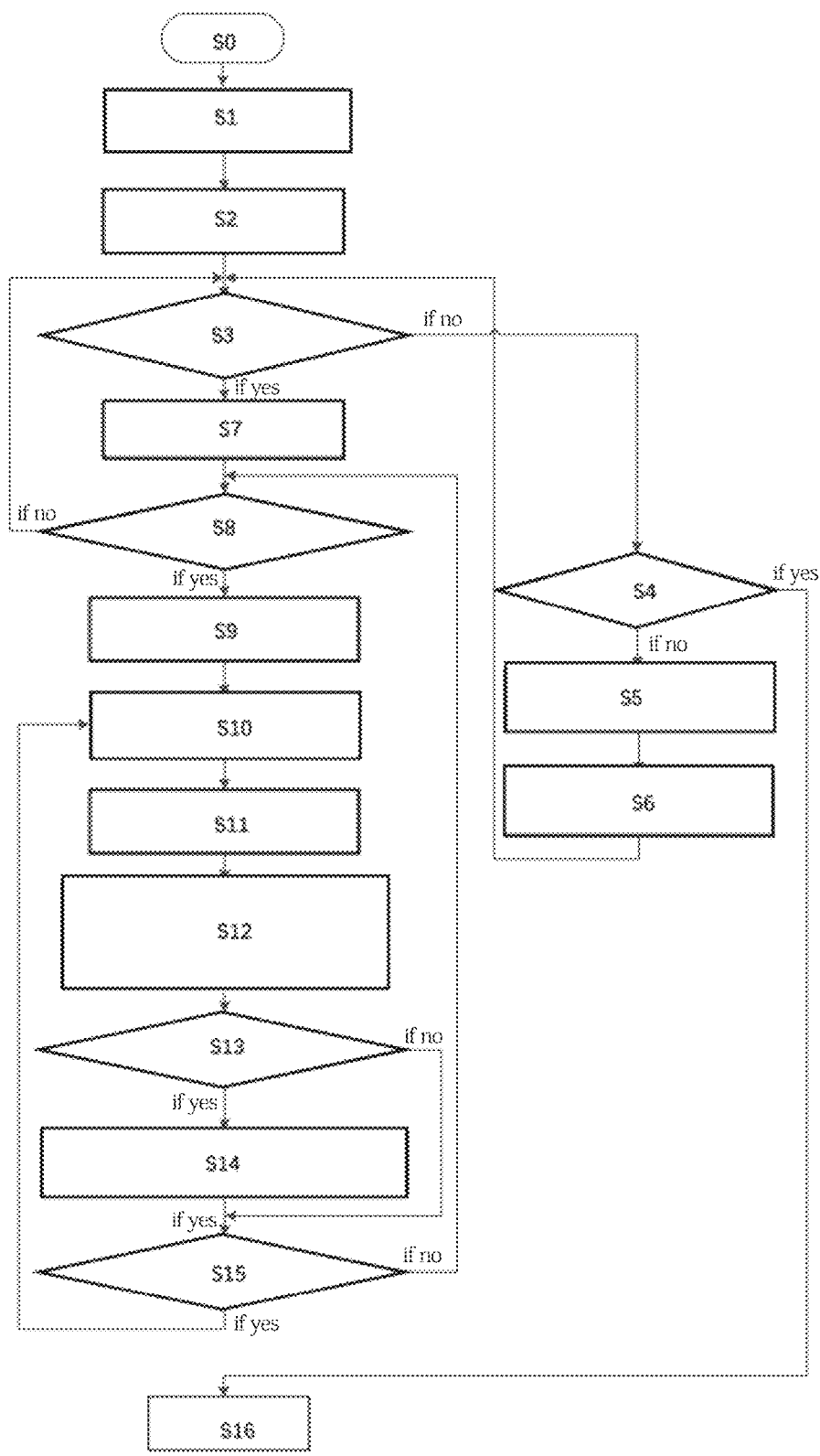
FIG. 9 is a flowchart of distributed, asynchronous graph processing according to the present invention.

As shown in FIG. 9, the steps executed by the first module may be:

S0: starting;
S1: fine-grained partitioning the graph partition of each computing node, and constructing core subgraphs;

S2: identifying the core graph vertices and coalescing the core graph vertex states;

S3: determining whether there is any active graph block; and if no, entering the step S4, or if yes, entering the step S7;

S4: determining whether the communication requirements are met; and if no, entering the step S5; or if yes; entering the step S16;

S5: generating state value dependency between the graph vertices having to communicate their state values and another not-directly-adjacent graph vertex;

S6: storing the state value dependency of the graph vertices;

S7: according to importance, selecting a graph block containing active graph vertices;

S8: determining whether the graph block having any active graph vertex; and if no, returning to the step S3; or if yes, entering the step S9;

S9: selecting the active graph vertices in the graph block and adding them to the queue Q;

S10: popping graph vertices from the queue Q in order;

S11: reading the edge data and the graph vertex state data related to the graph vertices;

S12: propagating the state value of the source vertex of each edge to the destination vertex of this edge to update the state value of the destination vertex, reading the graph vertex state value dependency table, propagating the post-communicated, updated, graph vertex state value to other graph vertices rapidly, and regularizing the updating of the state values of the graph vertices;

S13: determining whether the state value of the destination vertex is updated during updating; and if no, entering the step S15; or if yes, entering the step S14;

S14: setting the destination vertex as an active graph vertex, and adding it to the queue Q;

S15: determining whether there is any active graph vertex in the queue Q, and if no, returning to step S8; or if yes, entering step S16; and S16: ending.

Figure 10:
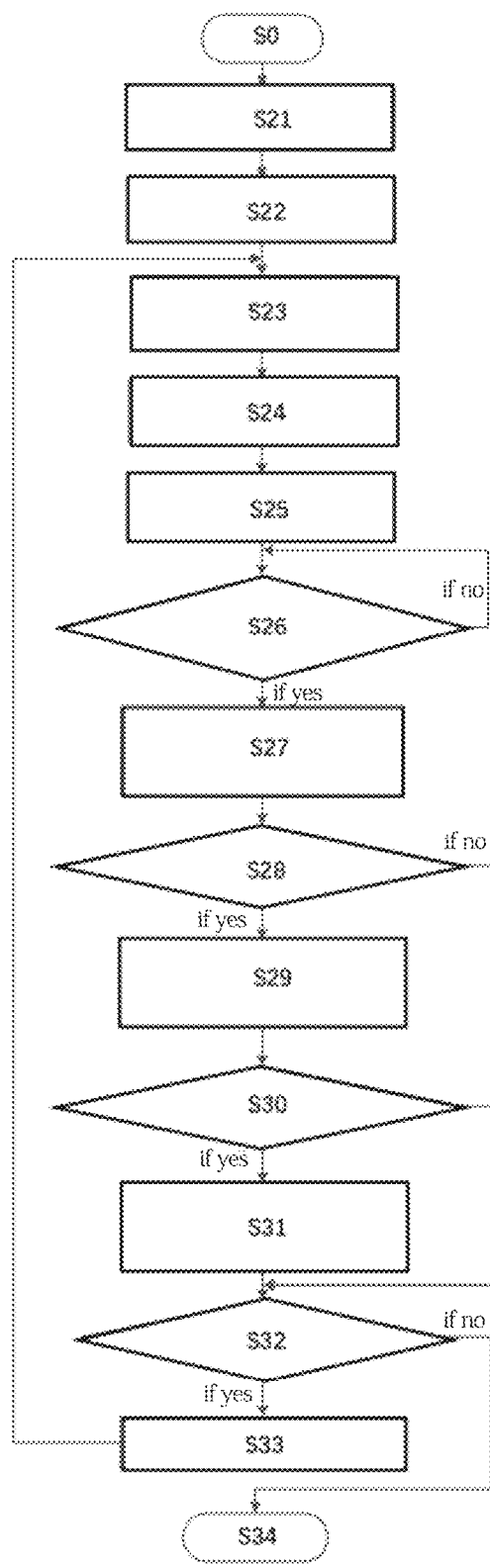
FIG. 10 is a flowchart of hierarchical, very-large-scale, distributed communication according to the present invention.

As shown in FIG. 10, the steps executed by the second module may be:

S0: starting;

S21: grouping the computing nodes to construct a hierarchical, tree-like communication architecture;

S22: partitioning the graph data and assigning the graph partition to individual computing nodes;

S23: after the $Tj^{th}$ round of graph computing for the computing nodes, using the updates of the graph vertex state data to generate the communication messages;

S24: performing reduction on communication messages related to the same graph vertices;

S25: merging the communication messages to be sent to the same computing node, and performing compression on the communication messages;

S26: determining whether the graph data of the computing node and of the computing nodes subordinate to it have converged; or if no, making the determination again; if yes, entering step S27;

S27: making the computing node and its subordinate computing nodes communicate with each other;

S28: determining whether all the graph vertex state values of the corresponding computing nodes remain unchanged; or if no, entering the step S32; if yes, entering the step S29;

S29: synchronizing the graph vertex state information with the computing node to which the computing node Node n is subordinate and other nodes at the same floor and subordinate to the computing node to which the computing node Node n is subordinate;

S30: determining whether there is a need to communicate with a computing node that is not directly subordinate to it or that it is not directly subordinate to; and if yes, entering the step S31; or if no, entering the step S32;

S31: sending and transferring the communication messages all together according to the tree-like communication structure by first collecting the communication messages at the parent computing node;

S32: determining, after communication of all the computing nodes, whether the graph vertex state value is updated; and if no, entering step S34; or if yes, entering the step S33;

S33: entering a new round of computing for the computing node Node n, j=j+1, and entering the step S23; and S34: ending.

The present invention further provides a storage device having a computer program stored thereon, the program, when executed by a processor, implements the step of the post-exascale graph computing method.

The present invention further provides an electronic device, comprising: a memory having a computer program stored thereon; a processor for executing the computer program in the memory to implement the step of the post-exascale graph computing method.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally", and they all indicate that the corresponding paragraph discloses an independent idea, and the applicant reserves the right to file a divisional application based on each of the inventive concepts.

What is claimed is:

1. A post-exascale graph computing method, comprising:
a step of performing distributed, asynchronous graph processing and a step of establishing hierarchical, very-large-scale, distributed communication;
in which said step of performing distributed, asynchronous graph processing comprises:
with a core subgraph constructed, having at least at least one computing node select graph blocks including active graph vertices in said core subgraph selected first for processing based on a topology-aware graph processing mechanism to propagate state information of graph vertices and accelerate state convergence among said graph vertices, generating a communications message, wherein each graph vertices contain respective state values;
and in which said step of establishing hierarchical, very-large-scale, distributed communication comprises:
arranging a plurality of computing nodes onto floors in a tree-like structure, partitioning graph data in a community-structure-aware manner, and assigning said graph data to individual said computing nodes on a floor, partitioning the graph data in a community-structure-aware manner to form graph partitions, wherein partitioning comprises: determining partitioned core subgraphs based on the graph partitions having their graph vertices highly dependent on each other; and grouping the partitioned core subgraphs into the same group of computing nodes on a floor according to the dependency of the state values, so that frequent communication among the partitioned core subgraphs happens inside the same group of computing nodes on the same floor, when plural said computing nodes on the same floor communicate, merging communication information associated with the same graph vertex based on reduction so as to decrease communication traffic, wherein reduction is by an algorithm in which information sent to the same computing node is merged into a same queue for communications at batch; and sending the communication information to be sent to the same computing node on a higher floor in a merged and unified form;

after the graph data of each said higher floor computing node and of a lower floor computing node that is subordinate to said higher floor computing node have converged, having said high floor computing node communicate, after reduction merger, and compression of communications messages, reducing communication traffic, with a next higher floor computing node that said higher floor computing node is subordinate to and with said higher floor computing nodes that are of said some floor as said higher floor computing node, so as to synchronize states of the graph vertices that are peers; and performing communication floor by floor until all said graph vertices in a cluster have their states converged.

2. A storage device having a computer program stored thereon, characterized in that the program, when executed by a processor, implements the step of the post-exascale graph computing method of claim 1.

3. An electronic device, characterized in that it comprises:
a memory having a computer program stored thereon;
a processor for executing the computer program in the memory to implement the step of the post-exascale graph computing method of claim 1.

4. A post-exascale graph computing system, comprising at least a processor, characterized in that the processor comprises at least:
a first module for performing distributed, asynchronous graph processing;
a second module for establishing hierarchical, very-large-scale, distributed communication;

wherein the first module is configured to:
with a core subgraph constructed, having at least at least one computing node select graph blocks including active graph vertices in said core subgraph selected first for processing based on a topology-aware graph processing mechanism to propagate state information of graph vertices and accelerate state convergence among said graph vertices, generating a communications message, wherein each graph vertices contain respective state values;

and the second module is configured to:
arranging a plurality of computing nodes onto floors in a tree-like structure, partitioning graph data in a community-structure-aware manner, and assigning said graph data to individual said computing nodes on a floor, partitioning the graph data in a community-structure-aware manner to form graph partitions, wherein partitioning comprises: determining partitioned core subgraphs based on the graph partitions having their graph vertices highly dependent on each other; and grouping the partitioned core subgraphs into the same group of computing nodes on a floor according to the dependency of the state values, so that frequent communication among the partitioned core subgraphs happens inside the same group of computing nodes on the same floor, when plural said computing nodes on the same floor communicate, merging communication information associated with the same graph vertex based on reduction so as to decrease communication traffic, wherein reduction is by an algorithm in which information sent to the same computing node is merged into a same queue for communications at batch; and sending the communication information to be sent to the same computing node on a higher floor in a merged and unified form;

after the graph data of each said higher floor computing node and of a lower floor computing node that is subordinate to said higher floor computing node have converged, having said high floor computing node communicate, after reduction merger, and compression of communications messages, reducing communication traffic, with a next higher floor computing node that said higher floor computing node is subordinate to and with said higher floor computing nodes that are of said some floor as said higher floor computing node, so as to synchronize states of the graph vertices that are peers; and performing communication floor by floor until all said graph vertices in a cluster have their states converged.

* * * * *